(12) United States Patent
Ogoe et al.

(10) Patent No.: US 10,267,362 B2
(45) Date of Patent: *Apr. 23, 2019

(54) SLIDING CONTACT SURFACE-FORMING MATERIAL, AND MULTI-LAYERED SLIDING CONTACT COMPONENT HAVING THE SAME

(75) Inventors: Hiroyuki Ogoe, Kanagawa (JP); Shinya Nishimura, Kanagawa (JP); Kentaro Okubo, Kanagawa (JP)

(73) Assignee: Oiles Corporation, Tokyo (JP)

( * ) Notice: Subject to any disclaimer, the term of this patent is extended or adjusted under 35 U.S.C. 154(b) by 346 days.

This patent is subject to a terminal disclaimer.

(21) Appl. No.: 13/496,915

(22) PCT Filed: Jul. 14, 2010

(86) PCT No.: PCT/JP2010/004562
§ 371 (c)(1),
(2), (4) Date: Mar. 19, 2012

(87) PCT Pub. No.: WO2011/039916
PCT Pub. Date: Apr. 7, 2011

(65) Prior Publication Data
US 2012/0178327 A1    Jul. 12, 2012

(30) Foreign Application Priority Data
Sep. 30, 2009 (JP) ................. 2009-228146

(51) Int. Cl.
*B32B 5/02* (2006.01)
*F16C 33/20* (2006.01)

(52) U.S. Cl.
CPC .......... *F16C 33/203* (2013.01); *F16C 33/201* (2013.01); *F16C 33/208* (2013.01);
(Continued)

(58) Field of Classification Search
CPC ..... C08J 5/04; C08J 5/046; C08J 5/047; C08J 5/048; F16C 17/00–17/035; F16C 33/201; F16C 33/203–33/206; D02G 3/28
(Continued)

(56) References Cited

U.S. PATENT DOCUMENTS

| 5,631,085 A | 5/1997 | Gebauer |
| 7,226,213 B2 * | 6/2007 | Roos et al. ................... 384/298 |

(Continued)

FOREIGN PATENT DOCUMENTS

| EP | 0585874 A1 | 3/1994 |
| JP | S39-14852 Y | 7/1964 |

(Continued)

OTHER PUBLICATIONS

Lawrence, C, Fundamentals of Spun Yarn Technology, 2003, CRC Press, 47-48.*

(Continued)

*Primary Examiner* — Jeremy R Pierce
(74) *Attorney, Agent, or Firm* — Carrier Blackman & Associates, P.C.; William D. Blackman; Joseph P. Carrier

(57) ABSTRACT

A sliding contact surface-forming material includes a reinforcing base impregnated with a resol-type phenolic resin having polytetrafluoroethylene resin dispersed therein. The reinforcing base being composed of a woven fabric formed by using, respectively as the warp and the weft, a ply yarn which is formed by paralleling at least two strands of a single twist yarn spun from fluorine-containing resin fiber and a single twist yarn spun from polyester fiber, and by twisting them in the direction opposite to the direction in which the single twist yarns were spun. Additionally, a multi-layered sliding contact component having the overall shape of a flat plate or a circular cylinder includes the (Continued)

above-described sliding contact surface-forming material so as to configure at least the sliding-contact surface thereof.

9 Claims, 6 Drawing Sheets

(52) U.S. Cl.
CPC ...... *F16C 2220/28* (2013.01); *F16C 2326/00* (2013.01); *F16C 2326/30* (2013.01); *Y10T 442/2926* (2015.04)

(58) Field of Classification Search
USPC ......... 57/200, 204, 236, 237, 238, 241, 243, 57/244, 258; 442/217, 218, 59, 7, 72, 73, 442/74, 75, 97, 98, 101, 170, 171, 181, 442/189, 197
See application file for complete search history.

(56) References Cited

U.S. PATENT DOCUMENTS

2005/0204719 A1* 9/2005 Ono et al. ................. 57/293
2012/0178328 A1* 7/2012 Ogoe et al. ................. 442/172

FOREIGN PATENT DOCUMENTS

| JP | S43-27504 A | | 11/1972 |
|---|---|---|---|
| JP | 04-225037 A | | 8/1992 |
| JP | 2009-091446 A | | 4/2009 |
| JP | 2009091446 A | * | 4/2009 |
| JP | 2009-103193 A | | 5/2009 |
| JP | 2009103193 A | * | 5/2009 |
| JP | 2010-120992 A | | 6/2010 |

OTHER PUBLICATIONS

Chawla, K, Fibrous Materials, 1997, Cambridge University Press, 13.*
Human Translation of JP 2009-103193A, May 14, 2009, pp. 1-34.*
Human Translation of JP 2009-091446A, Apr. 30, 2009, pp. 1-47.*
"Fukugo Zairyo to Kaimen (Composite Materials and Interface)", edited by the Editorial Committee of Material Technology of Japan Research Institute, p. 161-166, published on May 10, 1986, by Sogo Gijyutu Shuppan.

* cited by examiner

SLIDING CONTACT SURFACE-FORMING MATERIAL, AND MULTI-LAYERED SLIDING CONTACT COMPONENT HAVING THE SAME

TECHNICAL FIELD

The present invention relates to a sliding contact surface-forming material used for sliding contact components such as slide bearing, and a multi-layered sliding contact component having the sliding contact surface-forming material for the sliding contact surface thereof.

BACKGROUND ART

There have been well-known sliding contact component having flat or circular cylindrical geometry, configured by stacking resin work materials each composed of cotton fabric, as a reinforcing base, impregnated with a thermosetting synthetic resin such as phenolic resin and epoxy resin, or with a resin composition composed of the thermosetting resin added with polytetrafluoroethylene resin (Patent Document 1). The sliding contact component are adopted in a wide variety of fields, including wear ring fitted to the outer circumferential surface of piston of hydraulic cylinder, underwater slide bearing and so forth, by virtue of its excellence in the wear resistance, load resistance and rigidity. In particular, excellent performances of the phenolic resin under water lubrication are largely ascribable to the surface characteristics thereof, and are also possibly contributed by adsorption of water to the cotton fabric used as the base, and good affinity of OH group of the phenolic resin with water.

The circular cylindrical multi-layered sliding contact component manufactured using the fiber-reinforced resin composition composed of the cotton fabric and the phenolic resin has, however, been facing difficulty in keeping a constant clearance (gap of sliding contact) with respect to the opposing shaft, when used in a humid atmosphere or underwater, due to swelling and dimensional changes as a consequence. Such swelling of the circular cylindrical multi-layered sliding contact component is mainly ascribable to high water absorptivity of the cotton fabric used as the reinforcing base. Accordingly, low-water-absorptive synthetic fiber fabrics, composed of polyester fiber, polyacrylonitrile fiber and so forth, have attracted public attention as reinforcing bases other than the cotton fabric, intended for underwater applications. The synthetic fiber fabrics are advantageous also in that they are relatively inexpensive, and express reinforcing effects on resins.

The synthetic resins having these advantages, however, suffer from their poor adhesiveness to resins, when intended to achieve a satisfactory level of reinforcing effect with respect to the resins.

Patent Document 2 discloses a fiber-reinforced resin composition configured by using, as a reinforcing material, a woven fabric made of polyamide fiber, polyester fiber, polyacrylonitrile fiber or carbon fiber, and impregnated with a thermosetting synthetic resin such as phenolic resin added with fluorine-containing polymer, melamine resin, epoxy resin or alkyd resin, and a slide bearing using the same. In order to improve the adhesiveness between these synthetic fibers and the synthetic resins, the synthetic resins are added with co-condensation products of polyamide and polyvinyl alcohol derivatives, as adhesion enhancers.

Patent Document 3 discloses a reinforced plastic plate configured by stacking sheets of polyester fiber woven fabric, used as reinforcing bases, after being impregnated with an unsaturated polyester resin. It is, however, difficult to adhere the intact polyester fiber to the unsaturated polyester resin, due to a poor content of functional groups in the polyester fiber. The Patent Document 3 therefore describes that, in order to improve the adhesiveness, or affinity, of the fiber with the resin, the polyester fiber is annealed with a bisphenol-based epoxy resin adhesive in an organic solvent, at a temperature of 150° C. or below for 5 to 120 minutes.

Non-Patent Document 1 discloses a technique of a surface treatment for polyester fiber described below, aiming at improving interfacial adhesiveness between a polyester fiber woven fabric as a base and a resin as a matrix in a composite material.

(1) Chemical treatment for improving wettability with RFL (resolcinol folmaldehyde latex), for imparting reactivity, and for improving adhesiveness, by increasing the number of carboxyl groups, hydroxy groups, and amide groups, making use of property of polyester fiber susceptible to hydrolysis, amine-assisted decomposition, alcohol-assisted decomposition, and so forth.

(2) Physical treatment using electron beam, ultraviolet radiation, or low-temperature plasma.

(3) Surface treatment using isocyanate compounds.

(4) Surface treatment using ethylene urea, ethylene urethane, phenyl urethane or the like.

(5) Surface treatment using alkali.

Problems in the above-described techniques of surface treatment for synthetic fibers disclosed in Patent Document 2, Patent Document 3 and Non-Patent Document 1 are enumerated below:

(1) poor workability and very strong toxicity in some cases;

(2) treatment liquid is readily affected by temperature and humidity, and less stable;

(3) high cost due to need of large volume of treatment liquid; and (4) the synthetic fibers per se are degraded in some cases.

It is therefore understood that no techniques, capable of obtaining sufficient levels of improvement in the adhesiveness and safety, have been established as the methods of surface treatment of synthetic fibers.

PRIOR ART DOCUMENT

Patent Document

Patent Document 1: Japanese Examined Patent Publication No. S39-14852
Patent Document 2: Japanese Laid-Open Patent Publication No. H04-225037
Patent Document 3: Japanese Examined Patent Publication No. S43-27504

Non-Patent Document

Non-Patent Document 1: "Fukugo Zairyo to Kaimen (Composite Materials and Interface", edited by the Editorial Committee of Material Technology of Japan Research Institute, p. 161-166, published on May 10, 1986, by Sogo Gijyutu Shuppan

DISCLOSURE OF THE INVENTION

Problems to be Solved by the Invention

Considering the above-described situation, the present applicant previously proposed a fiber-reinforced resin composition capable of disusing surface treatment of polyester fiber used as a reinforcing base, and of obtaining a sufficient level of adhesiveness with respect to a phenolic resin, and a multi-layered sliding contact component, such as slide bearing, manufactured by using the fiber-reinforced resin composition (Japanese Laid-Open Patent Publication No. 2009-91446). The invention was to provide a multi-layered sliding contact component adoptable to a wide variety of applications under dry and frictional conditions, grease-lubricating conditions, and water lubricating conditions, since a specific resol-type phenolic resin mixed with a predetermined amount of polytetrafluoroethylene resin is excellent in the affinity with polyester fiber woven fabric, so that the fiber-reinforced resin composition provided herein may be excellent in adhesiveness with respect to the polyester fiber woven fabric, excellent in friction-proof and wear-proof characteristics, high in rigidity, large in mechanical strength, and extremely small in the amount of swelling even if used in a moist atmosphere such as in oil or water.

While the sliding contact component proposed in the above caused only an extremely small degree of swelling even if used under moist atmospheres typically in oil or water, and was excellent in friction-proof, wear-proof characteristics under such conditions, there has been a room for improvement in the friction-proof, wear-proof characteristics under dry frictional conditions such as in the air, particularly under oscillating conditions for testing journals. There has, therefore, been a need for improvement in the friction-proof, wear-proof characteristics under such conditions.

The present invention was conceived after considering the above-described problems, an object of which is to provide a sliding contact surface-forming material improved in the friction-proof, wear-proof characteristics under dry frictional conditions such as in the air, particularly under oscillating conditions for testing journals, while keeping the advantages of the previously-proposed sliding contact component unchanged, that is, while keeping the low swelling, friction-proof, and wear-proof characteristics under moist atmosphere typically under water unchanged, and to provide a multi-layered sliding contact component having the sliding contact surface-forming material so as to configure the sliding-contact surface thereof.

Means for Solving the Problems

According to the present invention, there is provided a sliding contact surface-forming material which includes a reinforcing base impregnated with a resol-type phenolic resin having a polytetrafluoroethylene resin powder dispersed therein. The reinforcing base is composed of a woven fabric formed by using, respectively as the warp and the weft, a ply yarn which is formed by paralleling at least two strands of a single twist yarn spun from fluorine-containing resin fiber and a single twist yarn spun from polyester fiber, and by twisting them in the direction opposite to the direction in which the single twist yarns were spun.

The fluorine-containing resin fiber adoptable herein include polytetrafluoroethylene (referred to as "PTFE", hereinafter) fiber, tetrafluoroethylene-perfluoroalkyl vinyl ether copolymer (referred to as "PFA", hereinafter) fiber, tetrafluoroethylene-hexafluoropropylene copolymer (referred to as "FEP", hereinafter) fiber and ethylene-tetrafluoroethylene copolymer (referred to as "ETFE", hereinafter) fiber. For the case where a particularly heat resistance is necessary in applications of sliding contact component, PTFE fiber is preferably selected.

The single twist yarn spun from fluorine-containing resin fiber, used for configuring the reinforcing base, is preferably a yarn of at least 400 denier, and the single twist yarn spun from polyester fiber, used for configuring the reinforcing base, is preferably a yarn having at least No. 30 cotton count.

The single twist yarns spun from fluorine-containing resin fiber and from polyester fiber are preferably lower-twisted (Z-twisted) yarns, and each of the single twist yarn spun from fluorine-containing resin fiber and the single twist yarn spun from polyester fiber preferably has a twist count of 260 to 300 T/m.

The ply yarn, which is formed by paralleling at least two strands of a single twist yarn spun from fluorine-containing resin fiber and a single twist yarn spun from polyester fiber, and by twisting them in the direction (S-direction) opposite to the direction in which the single twist yarns were spun, preferably has a twist count of 255 to 295 T/m.

The woven fabric, as the reinforcing base, formed by weaving the ply yarn is preferably a flat-woven fabric preferably having a density of 36 to 44 ends/inch for the warp (vertical yarn), and 36 to 44 picks/inch for the weft (horizontal yarn).

The sliding contact surface-forming material of the present invention preferably contains 35 to 50% by weight of the resol-type phenolic resin, 10 to 30% by weight of the PTFE powder, and 35 to 50% by weight of the reinforcing base (where, the contents of the three components totals 100% by weight).

The resol-type phenolic resin in the present invention is preferably synthesized by allowing a phenolic compound which contains 50 to 100 mol % of bisphenol A to react with a formaldehyde compound, while being catalyzed by an amine compound, has a number-average molecular weight Mn, measured by gel permeation chromatography, of 500 to 1000, and has a distribution index Mw/Mn, given as a ratio of weight-average molecular weight Mw and number-average molecular weight Mn, of 2.5 to 15.

The PTFE powder contained in the resol-type phenolic resin while being dispersed therein is preferably either of a high-molecular-weight polytetrafluoroethylene resin having a molecular weight of several millions to several tens of millions, or a low-molecular-weight polytetrafluoroethylene resin having a molecular weight of several thousands to several hundreds of thousands.

A multi-layered sliding contact component of the present invention has the overall shape of a flat plate and has the above-described sliding contact surface-forming material so as to configure typically at least the sliding-contact surface of a square metal backing made of a fiber-reinforced synthetic resin; or has the overall shape of a circular cylinder and has the above-described sliding contact surface-forming material so as to configure typically at least the sliding-contact surface of a circular cylindrical metal backing made of a fiber-reinforced synthetic resin.

Effect of the Invention

Since the reinforcing base, which is composed of a woven fabric formed by using, respectively as the warp and the weft, a ply yarn formed by paralleling at least two strands of a single twist yarn spun from fluorine-containing resin fiber and a single twist yarn spun from polyester fiber, and by twisting them in the direction opposite to the direction in which the single twist yarns were spun, allows the fluorine-containing resin fiber and the polyester fiber to expose on at least one surface thereof which serves as the sliding contact surface, while keeping almost equal areas of exposure, so that the present invention successfully provides a sliding contact surface-forming material, improved in the friction-proof and wear-proof characteristics, contributed also by low friction properties of the PTFE powder impregnated into the reinforcing base.

Since the woven fabric as the reinforcing base, woven using the ply yarn as the warp and weft, may be made thicker than a flat-woven fabric typically woven by using single twist yarn, so that the multi-layered sliding contact component, integrally having the sliding contact surface-forming material impregnated with a specific resol-type phenolic resin containing PTFE powder, may be subjected to machining, and thereby improving dimensional accuracy of the multi-layered sliding contact component.

The resol-type phenolic resin preferably used in the present invention is synthesized by allowing a phenolic compound which contains 50 to 100 mol % of bisphenol A to react with a formaldehyde compound, while being catalyzed by an amine compound, has a number-average molecular weight Mn, measured by gel permeation chromatography (GPC), of 500 to 1000, and has a distribution index Mw/Mn, given as a ratio of weight-average molecular weight Mw and number-average molecular weight Mn, of 2.5 to 15. The phenolic resin exhibits a good affinity with the hydrophobic polyester fiber, so that it may thoroughly be impregnated into the flat-woven fabric, and may therefore tightly adhere thereto. Accordingly, the surface treatment of the woven fabric containing polyester fiber, which has been necessary in the prior art, is no longer necessary.

DESCRIPTION OF EMBODIMENTS

The sliding contact surface-forming material, and the multi-layered sliding contact component using the sliding contact surface-forming material of the present invention will be explained in detail below.

The sliding contact surface-forming material of the present invention is configured by a reinforcing base impregnated with a resol-type phenolic resin having PTFE powder dispersed therein, wherein the reinforcing base is composed of a woven fabric formed by using, respectively as the warp and the weft, a ply yarn which is formed by paralleling at least two strands of a single twist yarn spun from fluorine-containing resin fiber and a single twist yarn spun from polyester fiber, and by twisting them in the direction opposite to the direction in which the single twist yarns were spun.

In the present invention, PTFE fiber, PFA fiber, FEP fiber, ETFE fiber and so forth may be used as the fluorine-containing resin fiber. Among them, PTFE fiber having a good heat resistance (melting point=327° C.) is particularly preferable for applications of the multi-layered sliding contact component in which heat resistance is required. The fluorine-containing resin fibers may be formed in both forms of spun yarn and filament yarn, wherein the spun yarn is preferable.

The single twist yarn spun from fluorine-containing resin fiber is a yarn formed by left-twisting (Z-twisting) of filament yarn or spun yarn of at least 400 denier, more preferably spun yarn, at 260 to 300 T/m.

The polyester fiber is preferably obtained generally by polycondensation of a dicarboxylic acid component and a diol component. The carboxylic acid component of polyester is exemplified by terephthalic acid, isophthalic acid, and naphthalene-2,6-dicarboxylic acid; and the diol component of polyester is exemplified by ethylene glycol, hydroquinone, bisphenol A, and biphenyl. Those capable of serving as the both are exemplified by p-hydroxybenzoic acid, and 2-oxy-6-naphthoic acid. The single twist yarn spun from polyester fiber herein is formed by left-twisting (Z-twisting) of filament yarn or spun yarn, preferably spun yarn, having a cotton count of at least No. 30 (in denier, approximately 177 denier), at 260 to 300 T/m.

In the present invention, the ply yarn is formed by paralleling at least two strands, wherein one is a single twist yarn composed of a spun yarn or filament yarn spun from fluorine-containing resin fiber, and the other is a single twist yarn composed of a spun yarn or filament yarn spun from polyester fiber, and by twisting them in the direction (S-twisting) opposite to the direction in which the single twist yarns were spun.

Figure 10:
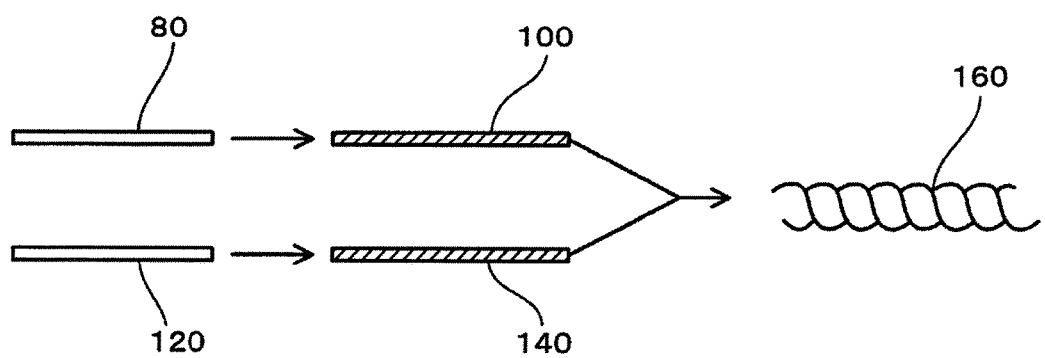
FIG. 10 is a drawing illustrating an exemplary method of manufacturing a ply yarn.

FIG. 10 is a drawing for explaining an exemplary method of manufacturing the ply yarn. Referring to FIG. 10, a single yarn 80 of fiber "A" is twisted to produce a single twist yarn 100 of fiber "A". Separately, a single yarn 120 of fiber "B" is twisted to produce a single twist yarn 140 of fiber "B". The single twist yarn 100 of fiber "A" and the single twist yarn 140 of fiber "B" are paralleled, and then twisted in the direction opposite to the direction in which the single twist yarns 100, 140 were spun, to thereby form a ply yarn 160.

A woven fabric which serves as the reinforcing base may be formed by weaving the ply yarn used as the warp (vertical yarn) and the weft (horizontal yarn). A flat-woven fabric having a density of 36 to 44 ends/inch for the vertical yarn (warp), and a density of 36 to 44 picks/inch for the horizontal yarn (weft), may preferably be used as the reinforcing base. Since the flat-woven fabric used as the reinforcing base allows the fluorine-containing resin fiber and the polyester fiber to expose on at least one surface thereof which serves as the sliding contact surface, while keeping almost equal areas of exposure, so that the flat-woven fabric successfully provides a sliding contact surface-forming material, improved in the friction-proof and wear-proof characteristics, contributed also by low friction properties of the PTFE powder impregnated into the fabric. Even if the woven fabric is machined, the fluorine-containing resin fiber and the polyester fiber expose in nearly equal areas on the surface which serves as the sliding contact surface, so that the friction-proof and wear-proof characteristics of the reinforcing base may be maintained over a long period. The woven fabric woven, as the reinforcing base, using the ply yarn as the warp and weft thereof may be thickened. The possibility of thickening allows machine processing of the sliding contact surface of the multi-layered sliding contact component which has, as integrally provided to the sliding contact surface thereof, the sliding contact surface-forming material, the reinforcing base of which is impregnated with a specific resol-type phenolic resin having PTFE dispersed therein. Accordingly, dimensional accuracy of the multi-layered sliding contact component may successfully be improved.

An appropriate amount of the reinforcing base composed of the woven fabric, contained in the sliding contact surface-forming material of the present invention, is 35 to 50% by weight. The amount of reinforcing base less than 35% by weight may fail in fully expressing the friction-proof and wear-proof characteristics, whereas the amount exceeding 50% by weight may reduce the amount of resol-type phenolic resin described later, and may therefore considerably degrade the moldability.

In the present invention, the resol-type phenolic resin is synthesized by allowing a phenolic compound containing 50 to 100 mol % of bisphenol A to react with a formaldehyde compound, while being catalyzed by an amine compound. The resol-type phenolic resin preferably has a number-average molecular weight Mn, measured by GPC, of 500 to 1000, and has a distribution index Mw/Mn, given as a ratio of weight-average molecular weight Mw and number-average molecular weight Mn, of 2.5 to 15.

As described in the above, the resol-type phenolic resin used in the present invention preferably has a ratio of bisphenol A ($C_{15}H_{16}O_2$) in the phenolic compound of 50 to 100 mol %. The ratio herein represents a ratio of molarity of bisphenol A relative to the total molarity of all phenolic compounds charged at the start of synthesis.

The thus-synthesized, resol-type phenolic resin preferably has a number-average molecular weight Mn, measured by GPC, of 500 to 1000, and a distribution index Mw/Mn of molecular weight distribution of 2.5 to 15. The resol-type phenolic resin is distinctively increased in the affinity to the polyester fiber-containing woven fabric. Accordingly, the sliding contact surface-forming material having good adhesiveness with polyester fiber may be obtained, without subjecting the polyester fiber to any surface treatment.

The resol-type phenolic resin having a bisphenol A content of less than 50 mol % may fail in obtaining a sufficient level of affinity to the polyester fiber, and may thereby fail in obtaining a sufficient level of adhesiveness with the polyester fiber-containing woven fabric. The resol-type phenolic resin also preferably has a number-average molecular weight Mn, measured by GPC, of 500 to 1000, and has a distribution index Mw/Mn of 2.5 to 15. The number-average molecular weight Mn smaller than 500 may induce degradation in the mechanical strength despite its desirable affinity with the polyester fiber, whereas the number-average molecular weight Mn exceeding 1000 may excessively elevates the viscosity of the resol-type phenolic resin, and may make the resin difficult to impregnate into the polyester fiber-containing woven fabric. The distribution index Mw/Mn of smaller than 2.5 may fail in obtaining a sufficient level of adhesiveness with the polyester fiber, whereas the distribution index Mw/Mn exceeding 15 may make the resin difficult to impregnate into the polyester fiber-containing woven fabric, similarly to the case where the number-average molecular weight Mn exceeds 1000.

Accordingly, the resol-type phenolic resin to be impregnated into the polyester fiber-containing woven fabric is now successful to ensure sufficient levels of readiness of impregnation and adhesiveness with respect to the polyester fiber-containing woven fabric, and the mechanical strength of the sliding contact surface-forming material, by adjusting the molar ratio of bisphenol A in the phenolic compound, and number-average molecular weight Mn and distribution index Mw/Mn measurable by GPC, to the above-described ranges.

For the case where the ratio of bisphenol A in the phenolic compound is less than 100 mol %, phenol compound other than bisphenol A is contained as a matter of course. The phenolic compound other than bisphenol A is exemplified by phenol, cresol, ethylphenol, aminophenol, resolcinol, xylenol, butylphenol, trimethylphenol, catechol, and phenylphenol. Among them, phenol is preferably used by virtue of its characteristics. The phenolic compounds other than bisphenol A may be used independently, or as a mixture of two or more species.

The formaldehyde compound is exemplified by formalin, paraformaldehyde, salicylaldehyde, benzaldehyde, and p-hydroxybenzaldehyde. In particular, formalin and paraformaldehyde are preferably used in view of readiness of synthesis. The formaldehyde compounds may be used independently, or as a mixture of two or more species.

The amines used as the catalyst is exemplified by triethylamine, triethanolamine, benzyldimethylamine, and aqueous ammonia. Among them, triethylamine and aqueous ammonia are preferably used in view of readiness of synthesis.

The content of resol-type phenolic resin contained in the sliding contact surface-forming material of the present invention is preferably 35 to 50% by weight. The content of resol-type phenolic resin less than 35% by weight may adversely affect the moldability (manufacturing) of the sliding contact surface-forming material, whereas the content exceeding 50% by weight may degrade the mechanical strength of the sliding contact surface-forming material.

The PTFE powder to be mixed to the resol-type phenolic resin may be either of molding powder (abbreviated as "high-molecular-weight PTFE", hereinafter) for molding, and PTFE (abbreviated as "low-molecular-weight PTFE", hereinafter) having the molecular weight reduced from that of the high-molecular-weight PTFE typically by irradiation. The low-molecular-weight PTFE is typically used as an additive, readily crushable, and highly dispersible.

Specific examples of the high-molecular-weight PTFE include "Teflon (registered trademark) 7-J", "Teflon (registered trademark) 7A-J", "Teflon (registered trademark) 70-J", etc. from Du Pont-Mitsui Fluorochemicals Co., Ltd.; "Polyflon M-12 (trade name)" etc. from Daikin Industries, Ltd.; and "Fluon G163 (trade name)", "Fluon G190 (trade name)", etc. from Asahi Glass Co., Ltd.

Specific examples of the low-molecular-weight PTFE include "TLP-10F (trade name)" etc. from Du Pont-Mitsui Fluorochemicals Co., Ltd.; "Lubron L-5 (trade name)" etc. from Daikin Industries, Ltd.; "Fluon L150J (trade name)", "Fluon L169J (trade name)", etc. from Asahi Glass Co., Ltd.; and "KTL-8N (trade name)", "KTL-2N (trade name)", etc. from Kitamura Ltd.

While both of high-molecular-weight PTFE and low-molecular-weight PTFE may be adoptable to the present invention, powder of low-molecular-weight PTFE is preferable, in view of uniform dispersion and suppression of void formation when mixed with the resol-type phenolic resin. The average particle size of the PTFE powder is preferably 1 to 50 μm, and more preferably 1 to 30 μm, in view of ensuring uniform dispersion and preventing voids from being formed.

An appropriate amount of PTFE contained in the sliding contact surface-forming material is 10 to 30% by weight. The amount of PTFE less than 10% by weight may fail in effectively improving the friction-proof and wear-proof characteristics, whereas the amount exceeding 30% by weight may increase the viscosity of resin in the process of molding, may form voids, may reduce adhesiveness of the resol-type phenolic resin, may reduce the strength of the sliding contact surface-forming material or the multi-layered sliding contact component, and may thereby induce separation between the layers.

As is understood from the explanation in the above, the sliding contact surface-forming material of the present invention is composed of 35 to 50% by weight of reinforcing base which is composed of a woven fabric formed by using, respectively as the warp (vertical yarn) and the weft (horizontal yarn), a ply yarn formed by a single twist yarn spun from fluorine-containing resin fiber and a single twist yarn spun from polyester fiber, 10 to 30% by weight of PTFE, and 35 to 50% by weight of resol-type phenolic resin. The sliding contact surface-forming material is excellent in all of moldability, mechanical strength, and friction-proof and wear-proof characteristics.

Next, the sliding contact surface-forming material and the multi-layered sliding contact component using the sliding contact surface-forming material will be explained referring to the attached drawings which illustrate preferred examples.

<Sliding Contact Surface-Forming Material>

Figure 1:
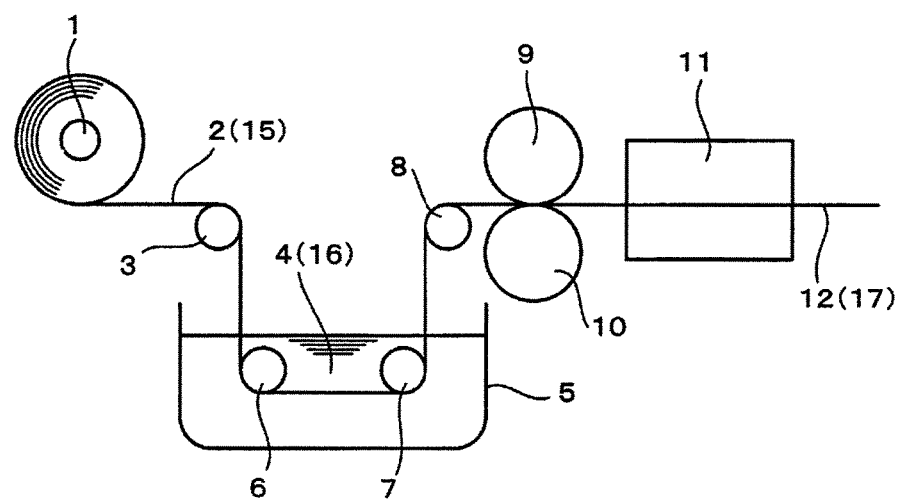
FIG. 1 is a drawing for explaining an apparatus for manufacturing a prepreg for configuring the sliding contact surface-forming material.
Figure 2:
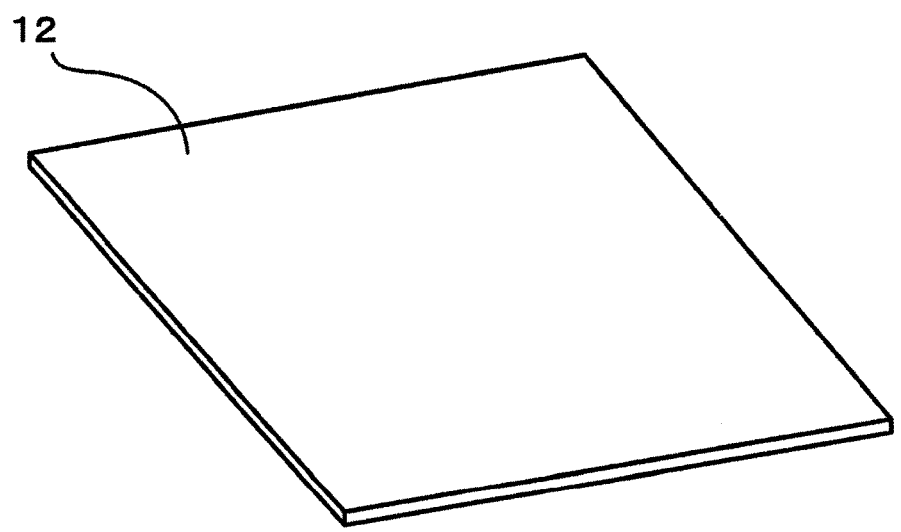
FIG. 2 is a perspective view illustrating the prepreg for configuring the sliding contact surface-forming material.

FIG. 1 is a drawing schematically illustrating an exemplary method of manufacturing a prepreg for configuring the sliding contact surface-forming material. In a manufacturing apparatus illustrated in FIG. 1, a reinforcing base 2 which is composed of a woven fabric formed by using, respectively as the warp (horizontal yarn) and the weft (vertical yarn), a ply yarn composed of a single twist yarn spun from fluorine-containing resin fiber and a single twist yarn spun from polyester fiber, preliminarily wound up on an uncoiler 1, is fed with the aid of a feed roller 3 to a container 5 which contains a mixed liquid 4 composed of PTFE powder and a resol-type phenolic resin varnish. The mixed liquid 4 is coated on the surface of the reinforcing base 2, as the reinforcing base 2 is allowed to pass through the mixed liquid 4 retained in the container 5 with the aid of guide rollers 6 and 7 provided in the container 5. The reinforcing base 2 coated with the mixed liquid 4 is fed by a feed roller 8 to compression rolls 9 and 10, where the mixed liquid 4 coated on the surface of the reinforcing base 2 is allowed to impregnate deep into voids in the fiber texture by the compression rolls 9 and 10. In the process of vaporization of the solvent, in a drying oven 11, out from the reinforcing base 2 coated and impregnated with the mixed liquid 4, also a reaction of the resol-type phenolic resin varnish proceeds, and thereby a moldable prepreg (resin base) 12 for configuring the sliding contact surface-forming material is manufactured. FIG. 2 is a perspective view illustrating the square-cut prepreg 12 for configuring the sliding contact surface-forming material.

Solid content of the resol-type phenolic resin 4 prepared by dissolving the resol-type phenolic resin into a volatile solvent is approximately 30 to 65% by weight of the whole resin varnish, viscosity of the resin varnish is preferably 800 to 5000 cP, and particularly preferably 1000 to 4000 cP.

<Flat Plate-Type Multi-Layered Sliding Contact Component>

Figure 3:
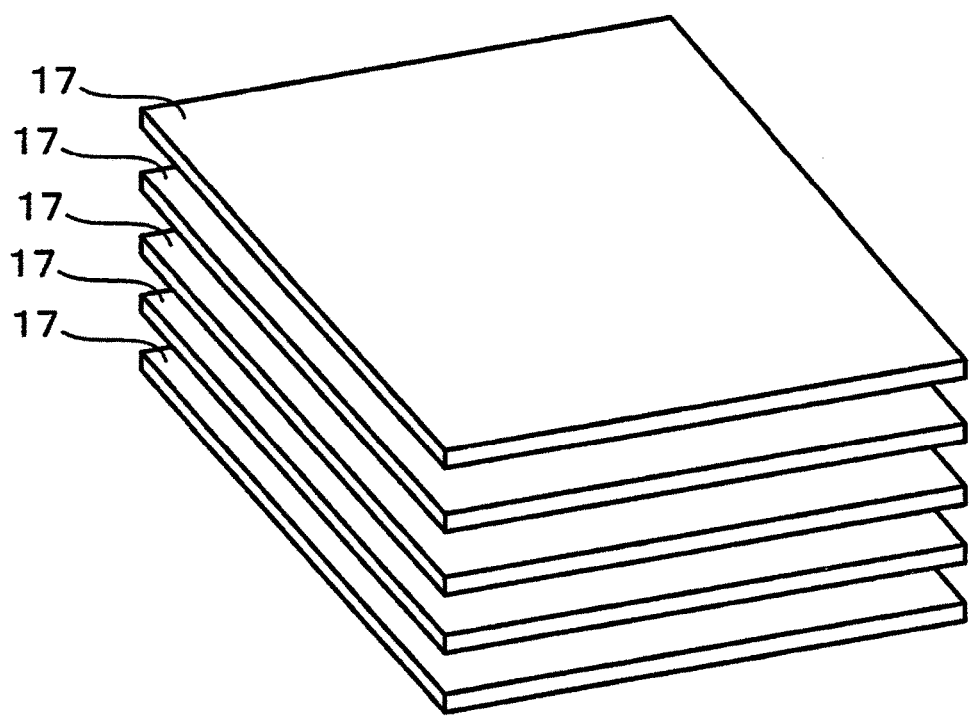
FIG. 3 is a perspective view illustrating resin bases (prepreg) composing a stack (metal backing)

A multi-layered sliding contact component 13 formed by using the prepreg 12 for configuring the sliding contact surface-forming material will be explained referring to FIG. 3 to FIG. 5. A metal backing 14 of the multi-layered sliding contact component 13 is manufactured using a manufacturing apparatus similar to that illustrated in FIG. 1 used in the method of manufacturing the prepreg 12 for configuring the sliding contact surface-forming material, and by a similar method of manufacturing. More specifically, a woven fabric 15 woven using an organic fiber or an inorganic fiber and wound up on the uncoiler 1 is fed with the aid of the feed roller 3 to the container 5 which contains a resol-type phenolic resin varnish 16, and allowed to pass through the resol-type phenolic resin varnish contained in the container 5 with the aid of the guide rollers 6 and 7 provided in the container 5. The resin varnish is thus coated on the surface of the woven fabric 15. The woven fabric 15 coated with the resin varnish is then fed by the feed roller 8 to the compression rolls 9 and 10, where the resin varnish is impregnated into the woven fabric 15. In the process of vaporization of the solvent, in the drying oven 11, out from the woven fabric 15, also a reaction of the resin varnish proceeds, and thereby a moldable prepreg (resin base) 17 for configuring the metal backing 14 is manufactured. FIG. 3 is a perspective view illustrating a plurality of square-cut prepregs 17 for configuring the metal backing.

Reinforcing fiber woven fabric adoptable to the metal backing 14 may be an inorganic fiber woven fabric such as glass fiber woven fabric, and carbon fiber woven fabric; or an organic fiber woven fabric such as aramid resin fiber woven fabric (copolyparaphenylene-3,4'-oxydiphenylene terephthalamide resin fiber woven fabric), each of which is appropriately selectable depending on applications of the multi-layered sliding contact component, proceeded under dry frictional conditions, underwater frictional conditions, boundary frictional conditions and so forth.

As illustrated in FIG. 3, a necessary number of sheets of the prepreg 17 for configuring the metal backing 14, having been square-cut so as to ensure a desired area, are prepared, where the number of sheets is determined so as to obtain a desired final thickness. On the other hand, at least one sheet of the prepreg 12 for configuring the sliding contact surface-forming material, having been square-cut similarly to the prepreg 17 for configuring the metal backing 14, is prepared. Next, as illustrated in FIG. 4, a predetermined number of sheets of prepreg 17 for configuring the metal backing are stacked in a square recess 19 of a die 18 of a heat pressing machine, and the prepregs 12 for configuring the sliding contact surface-forming material are placed thereon. The stack is heated to 140 to 160° C. in the die 18, and pressed under a load of 4.9 to 7 MPa in the direction of stacking using a ram 20, to thereby obtain a square laminated mold. The stacked prepregs 12 for configuring the sliding contact surface-forming material and the prepregs 17 for configuring the metal backing are bonded and fused with each other. The thus-obtained laminated mold is machined, to thereby give a flat plate-type multi-layered sliding contact component 13 illustrated in FIG. 5. The flat plate-type multi-layered sliding contact component 13 manufactured as described in the above has the metal backing 14 composed of a stack of inorganic fiber woven fabric or organic fiber woven fabric, and a slipping layer 21 composed of the prepreg 12 for configuring the sliding contact surface-forming material and integrally bonded to one surface of the metal backing 14. In the multi-layered sliding contact component 13, the slipping layer 21, which is composed of the prepreg 12 for configuring the sliding contact surface-forming material and is integrally bonded on the metal backing 14, is not only excellent in the friction-proof and wear-proof characteristics, but also improved in the load resistance. In addition, since the amount of swelling in moist atmosphere such as in oil or water is extremely small, so that the multi-layered sliding contact component 13 is adoptable to a wide variety of applications proceeded under dry frictional conditions, boundary frictional conditions, and water lubricating conditions.

<Circular Cylindrical Multi-Layered Sliding Contact Component>

Figure 6:
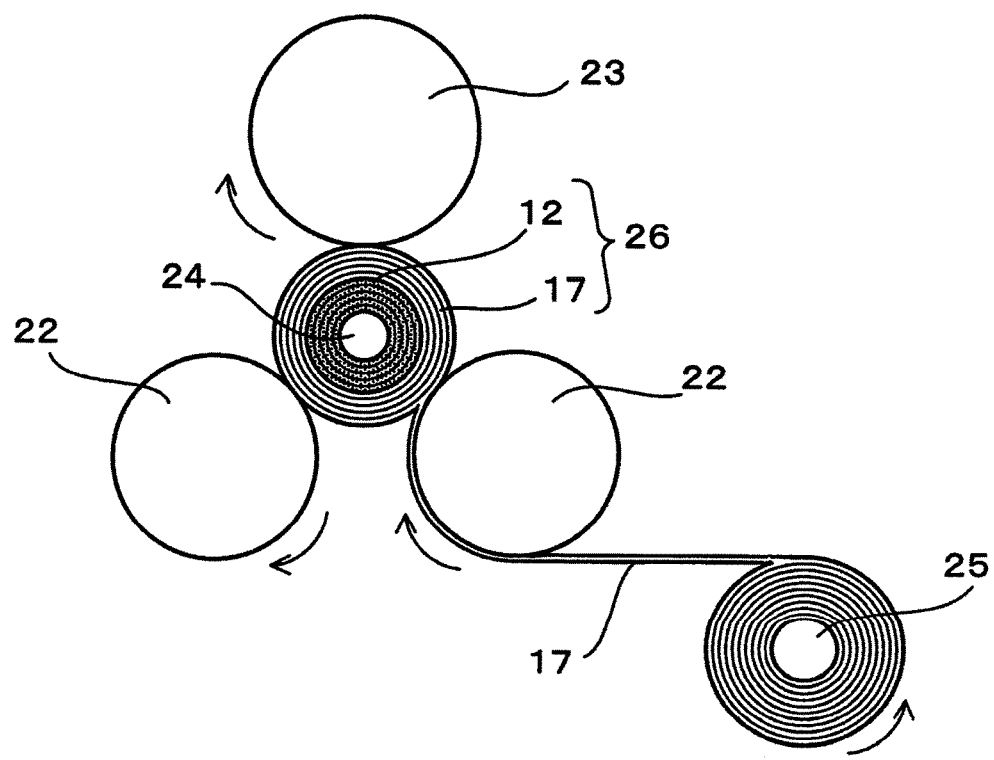
FIG. 6 is a drawing schematically illustrating an exemplary method of manufacturing a circular cylindrical multi-layered sliding contact component using the prepreg illustrated in FIG. 2.
Figure 7:
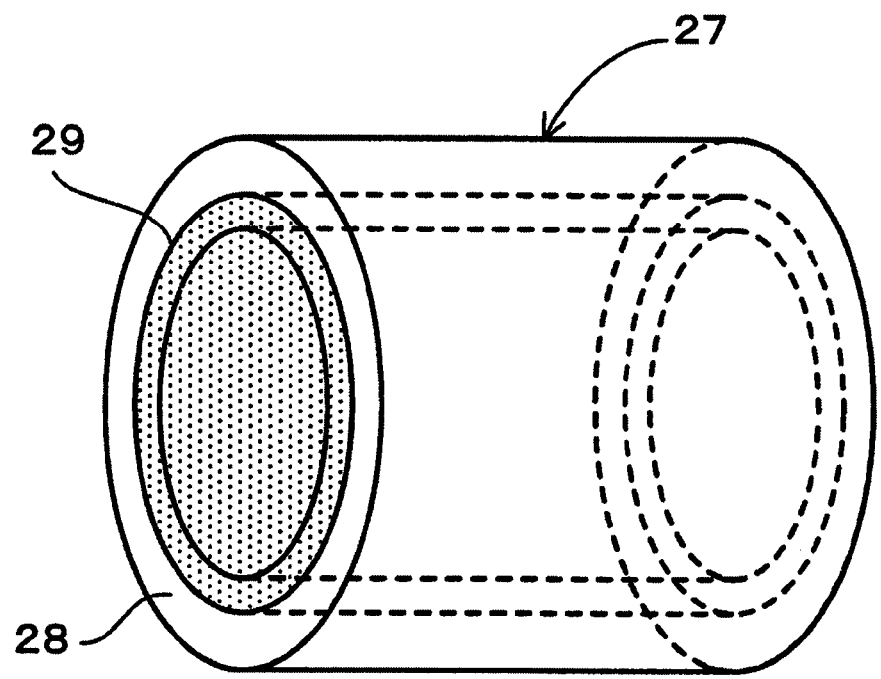
FIG. 7 is a perspective view illustrating the circular cylindrical multi-layered sliding contact component.

FIG. 6 and FIG. 7 are drawings illustrating an exemplary method of manufacturing of the circular cylindrical multi-layered sliding contact component, having the sliding contact surface-forming material integrally bonded to the sliding contact surface (inner circumferential surface). The circular cylindrical multi-layered sliding contact component may be manufactured by rolled forming using a rolled forming machine. A rolled forming machine illustrated in FIG. 6 generally has two heat rollers 22 and one pressure roller 23 respectively located at the apexes of triangle, and a core die 24 located at the center of the triangle, configured to form the circular cylindrical multi-layered sliding contact component while wrapping the prepregs 12 and 17 around the core die 24 and rotating the core die 24 in one direction, under heating and pressurizing by the three rollers 22, 22 and 23.

In the rolled forming machine illustrated in FIG. 6, rolled forming is conducted so that the prepreg 12 for configuring the sliding contact surface-forming material, slit to a predetermined width, is wrapped at least one turn around the outer circumferential surface of the core die 24 preliminarily heated to 120 to 200° C., the prepreg 17 for configuring the metal backing is fed further on the outer circumferential surface thereof from the feeding roll 25 via the heat rollers 22 heated to 120 to 200° C., and then wound to a desired final thickness (diameter) under a pressure of 2 to 6 MPa with the aid of the pressure roller 23. The thus-molded circular cylindrical laminated mold 26, as held around the core die 24, is cured under heating in a heating oven conditioned at an ambient temperature of 120 to 180° C., then cooled, the core die 24 is drawn out, to thereby obtain the circular cylindrical laminated mold 26. Next, the thus-manufactured circular cylindrical laminated mold 26 is machined to form a circular cylindrical multi-layered sliding contact component 27 having a desired dimension as illustrated in FIG. 7. The thus-formed circular cylindrical multi-layered sliding contact component 27 has a slipping layer 29 composed of the prepreg 12 for configuring the sliding contact surface-forming material, which is integrally bonded to the inner surface of the circular cylindrical metal backing 28. The inner circumferential surface of the slipping layer 29 serves as the sliding contact surface. The circular cylindrical multi-layered sliding contact component 27 is excellent in the friction-proof and wear-proof characteristics, improved in the load resistance, causative of an extremely small amount of swelling when used in a moist atmosphere such as in oil or water, and is therefore applicable to a wide variety of applications proceeded under dry frictional conditions, boundary frictional conditions, and water lubricating conditions.

EXAMPLE

The present invention will be detailed below referring to Examples. It is to be understood that the present invention is not limited to Examples below, without departing from the spirit thereof.

<Flat Plate-Type Multi-Layered Sliding Contact Component>

Examples 1 to 3

(Reinforcing Base for Sliding Contact Surface-Forming Material)

A single twist yarn formed by left-twisting (Z-twisting) at 280 T/m of a 400-denier spun yarn spun from PTFE fiber used as the fluorine-containing resin fiber, and a single twist yarn formed by left-twisting (Z-twisting) at 280 T/m of a No. 30-cotton-count spun yarn spun from polyester fiber, were prepared. One each of the single twist yarns were paralleled, and these two single twist yarns were twisted at 275 T/m in the direction (S-direction) opposite to the direction (Z-direction) in which the single twist yarns were spun, to form a ply yarn. Using the ply yarn as the warp (vertical yarn) and the weft (horizontal yarn), a flat-woven fabric having a density of 40 picks/inch for the horizontal yarn, and 40 ends/inch for the vertical yarn was produced. The flat-woven fabric was used later as a reinforcing base for the sliding contact surface-forming material.

(Resol-Type Phenolic Resin)

Into a separable flask equipped with a stirrer, a thermometer and a condenser tube, 300 g of bisphenol A and 192 g of a 37% aqueous formaldehyde solution were placed, 9 g of a 25% aqueous ammonia solution was added under stirring, the content was heated under normal pressure up to 90° C., and a condensation reaction was allowed to proceed for 2.5 hours. The content was then heated to 80° C. under a reduced pressure of 0.015 MPa for dehydration. The content was then added with 64 g of methanol, heated to 85° C. under normal pressure, a condensation reaction was allowed to proceed for 4 hours, the content was concentrated, diluted with methanol so as to adjust the resin solid content to 60% by weight, to thereby produce a resol-type phenolic resin (varnish with a solid content of 60% by weight). In Examples 1 to 3, the molar ratio of bisphenol A in the phenolic compound used herein was 100 mol %. By GPC measurement, the obtained resol-type phenolic resin was found to have a number-average molecular weight Mn of 900, and a distribution index Mw/Mn of molecular weight distribution of 5.6.

A low-molecular-weight PTFE powder (from Kitamura Ltd. KTL-2N (trade name)) was used as PTFE, a predetermined amount of which for each Example was mixed with, and dispersed into the resol-type phenolic resin varnish, to thereby prepare a mixed liquid of the resin varnish and the low-molecular-weight PTFE powder.

Now by using the manufacturing apparatus illustrated in FIG. 1, the reinforcing base 2, composed of a flat-woven fabric and preliminarily wound up on the uncoiler 1, was fed with the aid of the feed roller 3 to the container 5 which contains the mixed liquid 4. The mixed liquid 4 was coated on the surface of the reinforcing base 2, as the reinforcing base 2 was allowed to pass through the mixed liquid 4 retained in the container 5 with the aid of guide rollers 6 and 7 provided in the container 5. The reinforcing base 2 coated with the mixed liquid 4 was fed by the feed roller 8 to the compression rolls 9 and 10, where the mixed liquid 4 coated on the surface of the reinforcing base 2 was allowed to impregnate deep into voids in the fiber texture by the compression rolls 9 and 10. The reinforcing base 2 impregnated with the mixed liquid 4 was then fed to the drying oven 11, where the solvent was vaporized off, and the mixed liquid 4 was allowed to proceed a reaction, to thereby give the prepregs (resin base) 12 for configuring the sliding contact surface-forming material having the compositions listed below:

(Example 1) reinforcing base (flat-woven fabric)=43.5% by weight, PTFE=13% by weight, and resol-type phenolic resin=43.5% by weight;

(Example 2) reinforcing base (ditto)=40% by weight, PTFE=20% by weight, and resol-type phenolic resin=40% by weight; and (Example 3) reinforcing base (ditto)=37% by weight, PTFE=26% by weight, and resol-type phenolic resin=37% by weight.

(Metal Backing)

A glass fiber flat-woven fabric, woven using a glass fiber single yarn spun from 100 single fibers (monofilaments) each having 5-μm diameter, and having a density of 65 picks/inch for the weft (horizontal yarn) and a density of 65 ends/inch for the warp (vertical yarn), was used as the reinforcing fiber woven fabric, and the resol-type phenolic resin (varnish with a solid content of 60% by weight) same as that described in the above was used as a thermosetting synthetic resin. Using the manufacturing apparatus illustrated in FIG. 1, the glass fiber flat-woven fabric 15 preliminarily wound up on the uncoiler 1, was fed with the aid of the feed roller 3 to the container 5 which contains the resol-type phenolic resin varnish. The resin varnish was coated on the surface of the flat-woven fabric 15, as the flat-woven fabric 15 was allowed to pass through the resol-type phenolic resin varnish 16 retained in the container 5 with the aid of the guide rollers 6 and 7 provided in the container 5. The woven fabric 15 coated with the resin varnish was fed by the feed roller 8 to the compression rolls 9 and 10, where the resin varnish was impregnated into the woven fabric 15 by the compression rolls 9 and 10. The flat-woven fabric 15 was then fed to the drying oven 11, where the solvent was vaporized off, and the resin varnish was allowed to proceed a reaction, to thereby give the moldable prepregs 17 for configuring the metal backing, having a glass fiber flat-woven fabric content of 40% by weight, and a resol-type phenolic resin content of 60% by weight.

(Multi-Layered Sliding Contact Component)

Figure 4:
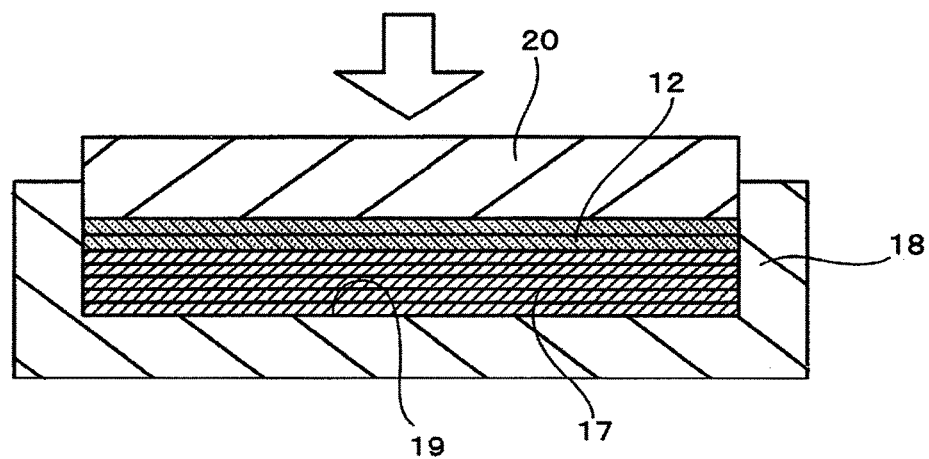
FIG. 4 is a drawing schematically illustrating an exemplary method of manufacturing the flat plate-type multi-layered sliding contact component using the prepreg illustrated in FIG. 2 and the prepreg illustrated in FIG. 3.
Figure 5:
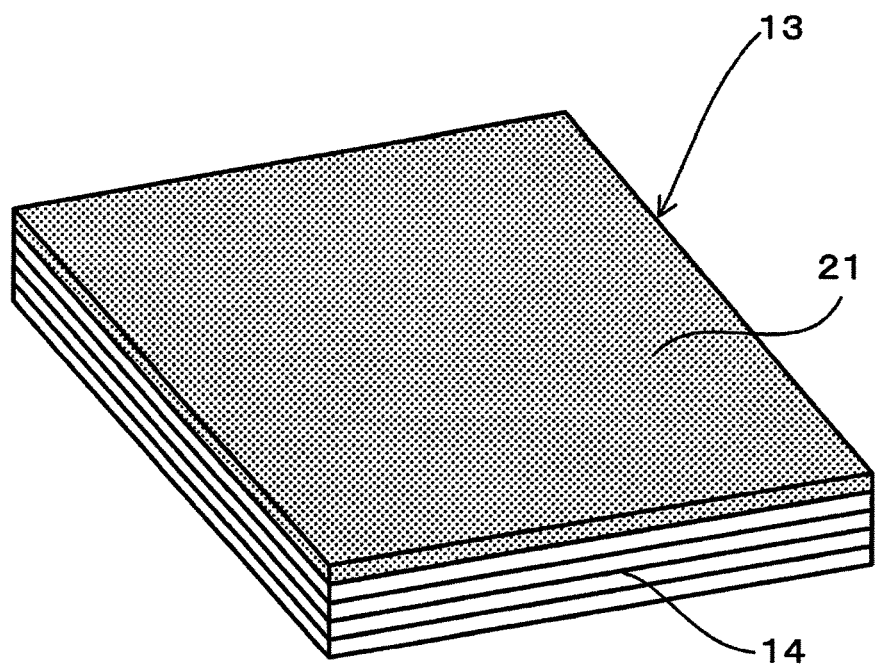
FIG. 5 is a schematic drawing illustrating a flat plate-type multi-layered sliding contact component.

The prepreg for configuring the metal backing was cut into 31-mm square sheets, and ten sheets were stacked in the square recess 19 of the die 18 of the heat pressing machine illustrated in FIG. 4. On the other hand, each of the prepregs for configuring the sliding contact surface-forming material, obtained in Example 1 to Example 3, was cut into 31-mm square sheets, and three of the sheets were stacked on the prepregs for configuring the metal backing preliminarily stacked in the recess 19 of the die, heated in the die 18 at 160° C. for 10 minutes, pressed in the direction of stacking at a pressure of 7 MPa, to thereby obtain a square laminated mold. The mold was machined, to thereby give a flat plate-type multi-layered sliding contact component 13 having an edge length of 30 mm and a thickness of 5 mm, composed of the metal backing 14, and the slipping layer 21 composed of the sliding contact surface-forming material integrally bonded to the surface of the metal backing 14.

Examples 4 to 6

(Reinforcing Base for Configuring Sliding Contact Surface-Forming Material)

Single twist yarns formed by left-twisting (Z-twisting) at 300 T/m of 400-denier spun yarn spun respectively from FEP fiber (Example 4), PFA fiber (Example 5), and ETFE fiber (Example 6) as the fluorine-containing resin fiber, and a single twist yarn formed by left-twisting (Z-twisting) at 300 T/m of polyester fiber of No. 30 cotton count, were prepared. One each of the single twist yarns were paralleled, and then twisted (S-twisting) at 295 T/m in the direction (S-direction) opposite to the direction (Z-direction) in which the single twist yarns were spun, to form a ply yarn. Using the ply yarn as the warp (vertical yarn) and the weft (horizontal yarn), a flat-woven fabric having a density of 40 picks/inch for the horizontal yarn, and 40 ends/inch for the vertical yarn was produced. The flat-woven fabric was used later as a reinforcing base 2 for configuring the sliding contact surface-forming material.

(Resol-Type Phenolic Resin)

In a separable flask similar to that used in the above-described Examples, 160 g of bisphenol A and 79 g of a 37% aqueous formaldehyde solution were placed, 1.3 g of triethylamine was added under stirring, the content was heated under normal pressure, and allowed to proceed a condensation reaction under a reflux condition at 100° C. for one hour. The content was then cooled, and 32 g of phenol, 30 g of a 37% aqueous formaldehyde solution, and 0.3 g of triethylamine were added. The content was heated under normal pressure, and allowed to proceed a condensation reaction under a reflux condition at 100° C. for 2 hour, and then heated to 80° C. under a reduced pressure of 0.015 MPa for dehydration. The content was then added with 24 g of methanol, heated to 90° C. under normal pressure, a condensation reaction was allowed to proceed for 4 hours, the content was concentrated, diluted with methanol so as to adjust the resin solid content to 60% by weight, to thereby produce a resol-type phenolic resin (varnish with a solid content of 60% by weight). In Examples 4 to 6, the molar ratio of bisphenol A in the phenolic compound used herein was 67.4 mol %. By GPC measurement, the obtained resol-type phenolic resin was found to have a number-average molecular weight Mn of 720, and a distribution index Mw/Mn of molecular weight distribution of 14.3.

A low-molecular-weight PTFE powder (same as that used in the above-described Examples) was used as PTFE, a predetermined amount of which for each Example was mixed with, and dispersed into the resol-type phenolic resin varnish, to thereby prepare a mixed liquid of the resin varnish and the low-molecular-weight PTFE powder.

Similarly to the above-described Examples, using the manufacturing apparatus illustrated in FIG. 1, the reinforcing base 2, composed of a flat-woven fabric and preliminarily wound up on the uncoiler 1, was fed with the aid of the feed roller 3 to the container 5 which contains the mixed liquid 4. The mixed liquid 4 was coated on the surface of the reinforcing base 2, as the reinforcing base 2 was allowed to pass through the mixed liquid 4 retained in the container 5 with the aid of the guide rollers 6 and 7 provided in the container 5. The reinforcing base 2 coated with the mixed liquid 4 was fed by the feed roller 8 to the compression rolls 9 and 10, where the mixed liquid 4 coated on the surface of the reinforcing base 2 was allowed to impregnate deep into voids in the fiber texture by the compression rolls 9 and 10. The reinforcing base 2 impregnated with the mixed liquid 4 was then fed to the drying oven 11, where the solvent was vaporized off, and the mixed liquid 4 was allowed to proceed a reaction, to thereby give the prepregs (resin base) for configuring the sliding contact surface-forming material having the compositions listed below:

(Example 4) reinforcing base (flat-woven fabric)=43.5% by weight, PTFE=13% by weight, and resol-type phenolic resin=43.5% by weight;

(Example 5) reinforcing base (ditto)=40% by weight, PTFE=20% by weight, and resol-type phenolic resin=40% by weight; and (Example 6) reinforcing base (ditto)=37% by weight, PTFE=26% by weight, and resol-type phenolic resin=37% by weight.

(Metal Backing)

The metal backing was manufactured by using the moldable prepreg for configuring the metal backing, having a glass fiber flat-woven fabric content of 40% by weight, and a resol-type phenolic resin content of 60% by weight, which is the same as that used in the above-described Examples.

(Multi-Layered Sliding Contact Component)

The multi-layered sliding contact component having an edge length of 30 mm and a thickness of 5 mm, composed of the metal backing, and the slipping layer composed of the sliding contact surface-forming material integrally bonded to the surface of the metal backing, was manufactured similarly as described in the aforementioned Examples.

(Circular Cylindrical Multi-Layered Sliding Contact Component)

Examples 7 to 9

In the rolled forming machine illustrated in FIG. 6, rolled forming was conducted so that the prepreg 12 for configuring the sliding contact surface-forming material, slit into 51-mm wide, same as that described in each of Examples 1 to 3, was wrapped three turns around the outer circumferential surface of the core die 24 having an outer diameter of 60 mm and preliminarily heated to 150° C., the prepreg 17 for configuring the metal backing, same as that described in the aforementioned Examples, was fed further on the outer circumferential surface thereof from the feeding roll 25 via the heat rollers 22 heated to 150° C., and then wound 15 turns under a pressure of 5 MPa with the aid of the pressure roller 23. The thus-molded circular cylindrical laminated mold 26, as held around the core die 24, was cured under heating in a heating oven conditioned at an ambient temperature of 150° C., then cooled, the core die 24 was drawn out, to thereby obtain the circular cylindrical laminated mold 26. Next, the thus-manufactured circular cylindrical laminated mold 26 was machined to form a circular cylindrical multi-layered sliding contact component 27 having an inner diameter of 60 mm, an outer diameter of 75 mm, and a length of 50 mm, as illustrated in FIG. 7. The circular cylindrical multi-layered sliding contact component 27 of Example 7 was given by using the sliding contact surface-forming material same as that used in Example 1, the circular cylindrical multi-layered sliding contact component 27 of Example 8 was given by using the sliding contact surface-forming material same as that used in Example 2, and the circular cylindrical multi-layered sliding contact component 27 of Example 9 was given by using the sliding contact surface-forming material same as that used in Example 3.

(Circular Cylindrical Multi-Layered Sliding Contact Component)

Examples 10 to 12

In the rolled forming machine illustrated in FIG. 6, rolled forming was conducted so that the prepreg 12 for configuring the sliding contact surface-forming material, slit into 51-mm wide, same as that described in each of Examples 4 to 6, was wrapped three turns around the outer circumferential surface of the core die 24 having an outer diameter of 60 mm and preliminarily heated to 150° C., the prepreg 17 for configuring the metal backing, same as that described in Examples, was fed further on the outer circumferential surface thereof from the feeding roll 25 via the heat rollers 21 heated to 150° C., and then wound 15 turns under a pressure of 5 MPa with the aid of the pressure roller 23. The thus-molded circular cylindrical laminated mold 26, as held around the core die 24, was cured under heating in a heating oven conditioned at an ambient temperature of 150° C., then cooled, the core die 24 was drawn out, to thereby obtain the circular cylindrical laminated mold 26. Next, the thus-manufactured circular cylindrical laminated mold 26 was machined to form a circular cylindrical multi-layered sliding contact component 27 having an inner diameter of 60 mm, an outer diameter of 75 mm, and a length of 50 mm, as illustrated in FIG. 7. The circular cylindrical multi-layered sliding contact component 27 of Example 10 was given by using the sliding contact surface-forming material same as that used in Example 4, the circular cylindrical multi-layered sliding contact component 27 of Example 11 was given by using the sliding contact surface-forming material same as that used in Example 5, and the circular cylindrical multi-layered sliding contact component 27 of Example 12 was given by using the sliding contact surface-forming material same as that used in Example 6.

<Flat Plate-Type Multi-Layered Sliding Contact Component>

Comparative Examples 1 to 3

The reinforcing fiber woven fabric used herein was a flat-woven fabric which was woven by using a polyester fiber spun yarn of No. 20 cotton count as the warp (vertical yarn) and the weft (horizontal yarn), with a density of 43 ends/inch for the warp, and a density of 42 picks/inch for the weft. By using the resol-type phenolic resin containing the PTFE powder same as that described in Examples 1 to 3, the prepregs for configuring the sliding contact surface-forming material having the compositions listed below were manufactured:

(Comparative Example 1) reinforcing base (flat-woven fabric)=43.5% by weight, PTFE=13% by weight, and resol-type phenolic resin=43.5% by weight;

(Comparative Example 2) reinforcing base (ditto)=40% by weight, PTFE=20% by weight, and resol-type phenolic resin=40% by weight; and (Comparative Example 3) reinforcing base (ditto)=37% by weight, PTFE=26% by weight, and resol-type phenolic resin=37% by weight.

The moldable prepreg 16 for configuring the metal backing, composed of 40% by weight of glass fiber flat-woven fabric, and 60% by weight of resol-type phenolic resin, same as that described in Example 1 to Example 3, were used as the prepreg for configuring the metal backing. The prepreg 17 for configuring the metal backing was cut into 31-mm square sheets, and ten sheets were stacked in the square recess 19 of the die 18 of the heat pressing machine illustrated in FIG. 4. On the other hand, the prepregs 12 for configuring the sliding contact surface-forming material, obtained in Comparative Example 1 was cut into 31-mm square sheets, and three of the sheets were stacked on the prepregs 17 for configuring the metal backing preliminarily stacked in the recess 19 of the die, heated in the die 18 at 160° C. for 10 minutes, pressed in the direction of stacking at a pressure of 7 MPa, to thereby obtain a square laminated mold. The mold was machined, to thereby give a multi-layered sliding contact component 13 having an edge length of 30 mm and a thickness of 5 mm, composed of the metal backing 14, and the slipping layer 21 composed of the sliding contact surface-forming material integrally bonded to the surface of the metal backing 14.

<Circular Cylindrical Multi-Layered Sliding Contact Component>

Comparative Examples 4 to 6

In the rolled forming machine illustrated in FIG. 6, rolled forming was conducted so that the prepreg 12 for configuring the sliding contact surface-forming material, slit into 51-mm wide, same as that described in each of Comparative Examples 1 to 3, was wrapped three turns around the outer circumferential surface of the core die 24 having an outer diameter of 60 mm and preliminarily heated to 150° C., the prepreg 16 for configuring the metal backing, same as that described in Examples 1 to 3, was fed further on the outer circumferential surface thereof from the feeding roll 25 via the heat rollers 22 heated to 150° C., and then wound 15 turns under a pressure of 5 MPa with the aid of the pressure roller 23. The thus-molded circular cylindrical laminated mold 26, as held around the core die 24, was cured under heating in a heating oven conditioned at an ambient temperature of 150° C., then cooled, the core die 24 was drawn out, to thereby obtain the circular cylindrical laminated mold 26. Next, the thus-manufactured circular cylindrical laminated mold 26 was machined to form a circular cylindrical multi-layered sliding contact component 27 having an inner diameter of 60 mm, an outer diameter of 75 mm, and a length of 50 mm, as illustrated in FIG. 7. The circular cylindrical multi-layered sliding contact component 27 of Comparative Example 4 was given by using the sliding contact surface-forming material same as that used in Comparative Example 1, the circular cylindrical multi-layered sliding contact component 27 of Comparative Example 5 was given by using the sliding contact surface-forming material same as that used in Comparative Example 2, and the circular cylindrical multi-layered sliding contact component 27 of Comparative Example 6 was given by using the sliding contact surface-forming material same as that used in Comparative Example 3.

Next, results of experiments on the friction-proof and wear-proof characteristics, and the amount of swelling (%) in water, of the multi-layered sliding contact components obtained in Examples and Comparative Examples will be explained.

Friction-Proof and Wear-Proof Characteristics of Flat Plate-Type Multi-Layered Sliding Contact Component in Examples 1 to 6 and Comparative Examples 1 to 3

(1) Thrust Bearing Test

The friction coefficient and amount of wear were measured according to the test conditions listed in Table 1. The amount of wear was represented by the amount of dimensional change observed after the 30-hour testing.

TABLE 1

Figure 8:
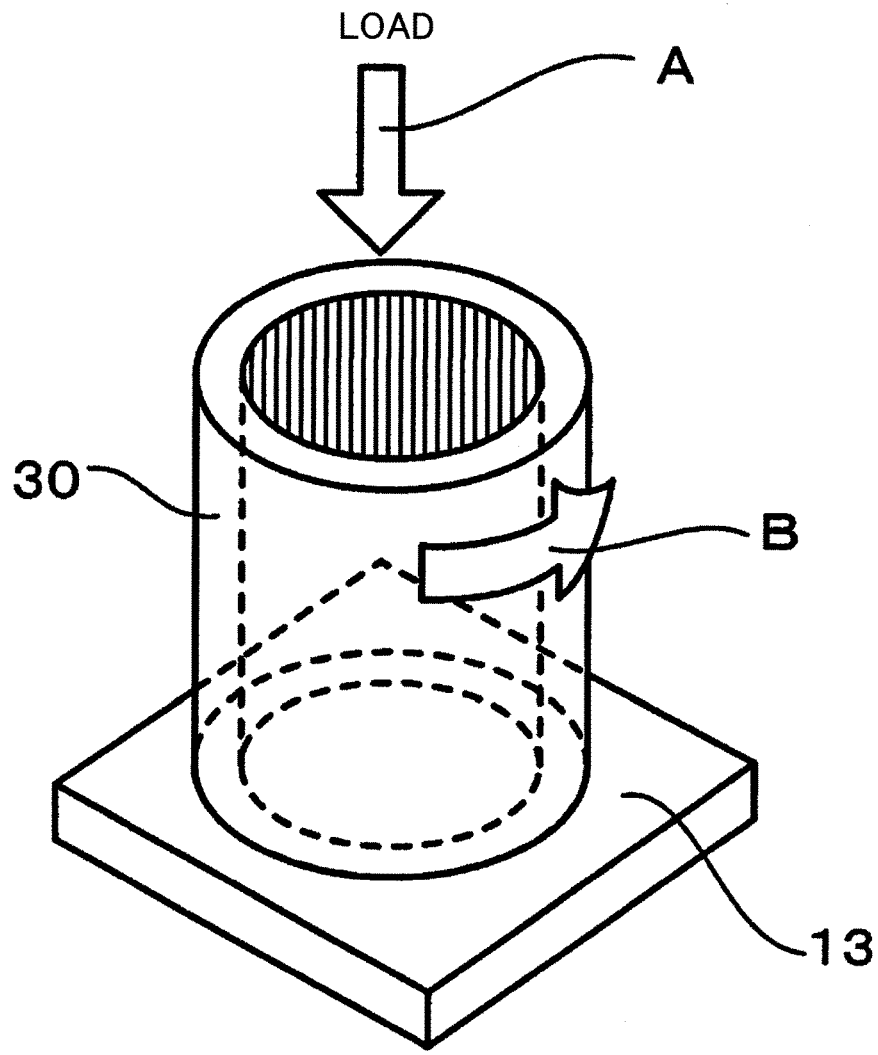
FIG. 8 is a perspective view illustrating a method of thrust bearing test.

| | |
|---|---|
| Surface pressure | 29.4 MPa (300 kgf/cm$^2$) |
| Sliding velocity | 2 m/min |
| Test period | 30 hours |
| Material of opposing member | austenitic stainless steel (SUS304) |
| Environment/Atmosphere | air |
| Lubrication | (1) none (dry) |
| | (2) greased on sliding contact surface |
| Test method | As illustrated in FIG. 8, a flat plate-type bearing test piece (multi-layered sliding contact component) 13 was fixed, an opposing circular cylinder 30 was allowed to rotate in the direction of arrow B, on the flat plate-type bearing test piece 13 (from the direction of arrow "A") while applying a predetermined load to the surface thereof, and the friction coefficient between the flat plate-type bearing test piece 13 and the circular cylinder 30, and the amount the wear (mm) of the flat plate-type bearing test piece 13 after the elapse of 30 hours were measured. |

Friction-Proof and Wear-Proof Characteristics of Circular Cylindrical Multi-Layered Sliding Contact Components in Examples 7 to 12 and Comparative Examples 4 to 6

(1) Oscillating Test for Journal

The friction coefficient and amount of wear were measured according to the test conditions listed in Tables 2 and 3. The amount of wear was represented by the amount of dimensional change observed after the 100-hour testing.

TABLE 2

| | |
|---|---|
| Surface pressure | 29.4 N/mm$^2$ (300 kgf/cm$^2$) |
| Sliding velocity | 0.008 m/s (0.50 m/min) |
| Oscillation speed | 120 cpm |
| Oscillation angle | 4° (±2°) |
| Environment/Atmosphere | (1) in air |
| | (2) in clean water |
| Lubrication | none |

TABLE 2-continued

Figure 9:
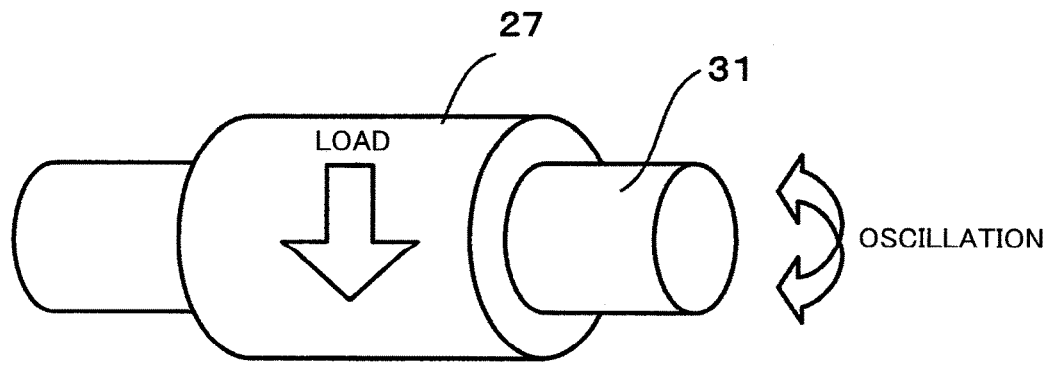
FIG. 9 is a perspective view illustrating a method of testing journal under oscillating conditions.

| Test method | As illustrated in FIG. 9, a circular cylindrical bearing test piece (circular cylindrical multi-layered sliding contact component) 27 was fixed under load, an opposing rotating shaft 31 was allowed to rotate under oscillation at a constant sliding velocity, then the friction coefficient between the circular cylindrical bearing test piece 27 and the rotating shaft 31, and the amount of wear (mm) on the inner circumferential surface (sliding contact surface) of the circular cylindrical bearing test piece 27 after the elapse of 100 hours were measured. |
|---|---|

TABLE 3

| Surface pressure | 29.4 N/mm² (300 kgf/cm²) |
|---|---|
| Sliding velocity | 0.012 m/s (1.13 m/min) |
| Oscillation speed | 12 cpm |
| Oscillation angle | 90° (±45°) |
| Environment/Atmosphere | in air |
| Lubrication | none |
| Test method | Same as the test method described in Table 2. |

<Test Method for Amount of Swelling>

The test pieces were immersed in water at 20° C. for 120 days, and then taken out for measurement of rate of dimensional change.

<Results>

Results of test on the friction and wear, and on the amount of swelling are shown in Table 4 to Table 6. In Table 4 to Table 6, the number-average molecular weight Mn and distribution index Mw/Mn of the resol-type phenolic resin were measured by GPC, and the values were estimated based on a standard curve prepared by using polystyrene as a standard substance. Measurement instruments are as follow:

GPC analyzer: HLC-8120 from Tosoh Corporation;
Column: TSK gel G3000HXL [exclusion limit molecular weight (polystyrene-based) 1×10³]×1, followed by TSK gel G2000HXL [exclusion limit molecular weight (polystyrene-based) 1×10⁴]×2, from Tosoh Corporation; and
Detector: UV-8020 from Tosoh Corporation

TABLE 4

| Flat plate-type multi-layered sliding contact component | | | Example | | | | | |
|---|---|---|---|---|---|---|---|---|
| | | | 1 | 2 | 3 | 4 | 5 | 6 |
| Sliding contact surface-forming material | Reinforcing base (fluorine-containing resin fiber and polyester fiber) | | 43.5 | 40 PTFE | 37 | 43.5 FEP | 40 PFA | 37 ETFE |
| | PTFE | | 13 | 20 | 26 | 13 | 20 | 26 |
| | Resol-type phenolic resin | | 43.5 | 40 | 37 | 43.5 | 40 | 37 |
| Ratio of bisphenol A (mol %) | | | | 100 | | | 67.4 | |
| Molecular weight Mn | | | | 900 | | | 720 | |
| Distribution Mw/Mn | | | | 5.6 | | | 14.3 | |
| Friction-proof, wear-proof characteristics | Thrust bearing test Lubrication (dry) | Friction coefficient | 0.08 | 0.07 | 0.06 | 0.09 | 0.08 | 0.08 |
| | | Amount of wear (mm) | 0.08 | 0.09 | 0.09 | 0.09 | 0.09 | 0.09 |
| | Thrust bearing test Lubrication (greased) | Friction coefficient | 0.06 | 0.06 | 0.05 | 0.06 | 0.07 | 0.07 |
| | | Amount of wear (mm) | 0.05 | 0.04 | 0.04 | 0.06 | 0.06 | 0.07 |
| Amount of swelling | Rate of change in length (%) | | 0.12 | 0.10 | 0.12 | 0.12 | 0.10 | 0.13 |
| | Rate of change in thickness (%) | | 0.54 | 0.52 | 0.56 | 0.52 | 0.54 | 0.50 |

TABLE 5

| Flat plate-type multi-layered sliding contact component | | | Comparative Example | | |
|---|---|---|---|---|---|
| | | | 1 | 2 | 3 |
| Sliding contact surface-forming material | Reinforcing base (polyester fiber) | | 43.5 | 40 | 37 |
| | PTFE | | 13 | 20 | 26 |
| | Resol-type phenolic resin | | 43.5 | 40 | 37 |
| Ratio of bisphenol A (mol %) | | | | 100 | |
| Molecular weight Mn | | | | 900 | |
| Distribution Mw/Mn | | | | 5.6 | |
| Friction-proof, wear-proof characteristics | Thrust bearing test Lubrication (dry) | Friction coefficient | 0.13 | 0.12 | 0.10 |
| | | Amount of wear (mm) | 0.08 | 0.09 | 0.10 |
| | Thrust bearing test Lubrication (greased) | Friction coefficient | 0.08 | 0.06 | 0.07 |
| | | Amount of wear (mm) | 0.03 | 0.03 | 0.04 |
| Amount of swelling | Rate of change in length (%) | | 0.18 | 0.19 | 0.18 |
| | Rate of change in thickness (%) | | 0.60 | 0.58 | 0.62 |

TABLE 6

| Circular cylindrical multi-layered sliding contact component | | | Example | | | | | |
|---|---|---|---|---|---|---|---|---|
| | | | 7 | 8 | 9 | 10 | 11 | 12 |
| Sliding contact surface-forming material | Reinforcing base (fluorine-containing resin fiber and polyester fiber) | | 43.5 | 40 PTFE | 37 | 43.5 FEP | 40 PFA | 37 ETFE |
| | PTFE | | 13 | 20 | 26 | 13 | 20 | 26 |
| | Resol-type phenolic resin | | 43.5 | 40 | 37 | 43.5 | 40 | 37 |
| Ratio of bisphenol A (mol %) | | | | 100 | | | 67.4 | |
| Molecular weight Mn | | | | 900 | | | 720 | |
| Distribution Mw/Mn | | | | 5.6 | | | 14.3 | |
| Friction-proof, wear-proof characteristics | Oscillation test for journal (in air: angle of oscillation = 4°) | Friction coefficient | 0.07 | 0.07 | 0.06 | 0.08 | 0.08 | 0.08 |
| | | Amount of wear (mm) | 0.02 | 0.03 | 0.03 | 0.03 | 0.03 | 0.03 |
| | Oscillation test for journal (in clean water: angle of oscillation = 4°) | Friction coefficient | 0.08 | 0.08 | 0.08 | 0.08 | 0.08 | 0.09 |
| | | Amount of wear (mm) | 0.01 | 0.01 | 0.01 | 0.02 | 0.02 | 0.03 |
| | Oscillation test for journal (in air: angle of oscillation = 90°) | Friction coefficient | 0.08 | 0.07 | 0.07 | 0.08 | 0.07 | 0.07 |
| | | Amount of wear (mm) | 0.04 | 0.05 | 0.05 | 0.04 | 0.05 | 0.05 |
| Amount of swelling | Rate of change in inner diameter (%) | | 0.12 | 0.12 | 0.13 | 0.13 | 0.12 | 0.13 |
| | Rate of change in outer diameter (%) | | 0.28 | 0.28 | 0.30 | 0.30 | 0.28 | 0.32 |
| | Rate of change in length (%) | | 0.23 | 0.25 | 0.25 | 0.26 | 0.25 | 0.26 |

TABLE 7

| Circular cylindrical multi-layered sliding contact component | | | Comparative Example | | |
|---|---|---|---|---|---|
| | | | 4 | 5 | 6 |
| Sliding contact surface-forming material | Reinforcing base (polyester resin fiber) | | 43.5 | 40 | 37 |
| | PTFE | | 13 | 20 | 26 |
| | Resol-type phenolic resin | | 43.5 | 40 | 37 |
| Ratio of bisphenol A (mol %) | | | | 100 | |
| Molecular weight Mn | | | | 900 | |
| Distribution Mw/Mn | | | | 5.6 | |
| Friction-proof, wear-proof characteristics | Oscillation test for journal (in air: angle of oscillation = 4°) | Friction coefficient | 0.11 | 0.12 | 0.10 |
| | | Amount of wear (mm) | 0.05 | 0.09 | 0.10 |
| | Oscillation test for journal (in clean water: angle of oscillation = 4°) | Friction coefficient | 0.08 | 0.06 | 0.07 |
| | | Amount of wear (mm) | 0.03 | 0.03 | 0.04 |
| | Oscillation test for journal (in air: angle of oscillation = 90°) | Friction coefficient | 0.14 | 0.12 | 0.12 |
| | | Amount of wear ( mm) | 0.61 | 0.65 | 0.72 |
| Amount of swelling | Rate of change in inner diameter (%) | | 0.12 | 0.13 | 0.13 |
| | Rate of change in outer diameter (%) | | 0.28 | 0.30 | 0.30 |
| | Rate of change in length (%) | | 0.25 | 0.28 | 0.26 |

The molar ratio of bisphenol A shown in Table 4 to Table 7 were calculated by the equation below:

molar ratio=(molarity of bisphenol $A$ as charged/total molarity of phenolic compounds as charged)× 100(mol %).

It is understood from the test results, particularly from comparison of the friction-proof and wear-proof characteristics under journal oscillating conditions shown in Table 6 and Table 7, that the multi-layered sliding contact components of Examples 7 to 12 were found to show smaller friction coefficients and improved wear resistance, as compared with the conventional multi-layered sliding contact components of Comparative Examples 4 to 6. In particular in the test at an angle of oscillation of journal of 90° (±45°), the multi-layered sliding contact components of Examples 7 to 12 were found to be largely improved in the wear resistance, as compared with the conventional multi-layered sliding contact components of Comparative Examples 4 to 6. The multi-layered sliding contact components in Examples and Comparative Examples showed almost equivalent amounts of swelling.

INDUSTRIAL APPLICABILITY

As described in the above, the reinforcing base, which configures the sliding contact surface-forming material of the present invention, and is composed of a woven fabric formed by using, respectively as the warp and the weft, a ply yarn formed by paralleling at least two strands of a single twist yarn spun from fluorine-containing resin fiber and a single twist yarn spun from polyester fiber, and by twisting them in the direction opposite to the direction in which the single twist yarns were spun, allows the fluorine-containing resin fiber and the polyester fiber to expose on at least one surface thereof which serves as the sliding contact surface, while keeping almost equal areas of exposure. The present invention therefore successfully provides a sliding contact surface-forming material, improved in the friction-proof and wear-proof characteristics contributed by low friction properties of the PTFE powder impregnated into the woven fabric. The multi-layered sliding contact component, which has such sliding contact surface-forming material so as to configure the sliding contact surface, has excellent friction-proof and wear-proof characteristics, high rigidity, and excellent mechanical strength. In addition, since the multi-layered sliding contact component shows an extremely small amount of swelling in moist atmosphere such as underwater, so that dimensional changes ascribable the swelling will be extremely small, and this makes the component adoptable to

EXPLANATION OF THE MARKS 2 reinforcing base
12 prepreg for configuring the sliding contact surface-forming material
13 flat plate-type multi-layered sliding contact component
14 metal backing
17 prepreg for configuring the metal backing
21 slipping layer
27 circular cylindrical multi-layered sliding contact component

The invention claimed is:

1. A sliding contact surface-forming material comprising a reinforcing base impregnated with a resol phenolic resin having polytetrafluoroethylene resin dispersed therein,
the reinforcing base comprising a woven fabric formed by using, respectively as each of the warp and the weft, a ply yarn which is formed by paralleling at least two strands of:
a single twist yarn spun from fluorine-containing resin fiber, and
a single twist yarn spun from polyester fiber,
and by twisting them in a direction opposite to the direction in which the single twist yarns were spun; and
wherein the reinforcing base is a flat-woven fabric having a density of 36 to 44 ends/inch for the warp (vertical yarn), and 36 to 44 picks/inch for the weft (horizontal yarn),
wherein the single twist yarn spun from fluorine-containing resin fiber is a yarn of at least 400 denier,
wherein the single twist yarn spun from polyester fiber has at least No. 30 cotton count,
wherein each single twist yarn has a twist count of 260 to 300 T/m,
wherein the ply yarn has a twist count of 255 to 295 T/m,
wherein the sliding contact surface-forming material is configured for use in a moist environment, and is further configured so that the fluorine-containing resin fiber and the polyester fiber are both exposed on at least one surface thereof which serves as the sliding contact surface, while keeping substantially equal areas of exposure of the fluorine-containing resin fiber and the polyester fiber on the sliding contact surface, and
wherein the sliding contact surface-forming material contains 37 to 43.5% by weight of the resol phenolic resin, 13 to 26% by weight of the polytetrafluoroethylene resin, and 37 to 43.5% by weight of the reinforcing base.

2. The sliding contact surface-forming material according to claim 1, wherein the fluorine-containing resin fiber is selected from polytetrafluoroethylene fiber, tetrafluoroethylene-perfluoroalkyl vinyl ether copolymer fiber, tetrafluoroethylene-hexafluoropropylene copolymer fiber and ethylene-tetrafluoroethylene copolymer fiber.

3. The sliding contact surface-forming material according to claim 1, wherein the single twist yarns are lower-twisted (Z-twisted) yarns.

4. The sliding contact surface-forming material according to claim 1, wherein the resol phenolic resin is synthesized by allowing a phenolic compound which contains 50 to 100 mol % of bisphenol A to react with a formaldehyde compound, while being catalyzed by an amine compound, has a number-average molecular weight Mn, measured by gel permeation chromatography, of 500 to 1000, and has a dispersion index Mw/Mn, given as a ratio of weight-average molecular weight Mw and number-average molecular weight Mn, of 2.5 to 15.

5. The sliding contact surface-forming material according to claim 1, wherein the polytetrafluoroethylene resin is either of a high-molecular-weight polytetrafluoroethylene resin or a low-molecular-weight polytetrafluoroethylene resin.

6. A multi-layered sliding contact component having the overall shape of a flat plate, and having the sliding contact surface-forming material described in claim 5, so as to configure at least the sliding-contact surface thereof.

7. A multi-layered sliding contact component having the overall shape of a circular cylinder, and having the sliding contact surface-forming material described in claim 1 so as to configure at least the sliding-contact surface thereof.

8. A sliding contact surface-forming material comprising a reinforcing base impregnated with a resol phenolic resin having polytetrafluoroethylene resin dispersed therein,
the reinforcing base comprising a woven fabric formed by using a ply yarn as each of the warp and the weft, respectively, said ply yarn formed by paralleling at least two strands of:
a Z-twisted single twist yarn spun from fluorine-containing resin fiber selected from the group consisting of polytetrafluoroethylene fiber, tetrafluoroethylene-perfluoroalkyl vinyl ether copolymer fiber, tetrafluoroethylene-hexafluoropropylene copolymer fiber, and ethylene-tetrafluoroethylene copolymer fiber, and
a Z-twisted single twist yarn spun from polyester fiber,
and by twisting them in an S-twist in a direction opposite to the direction in which the single twist yarns were spun; and
wherein the reinforcing base is a flat-woven fabric having a density of 36 to 44 ends/inch for the warp (vertical yarn), and 36 to 44 picks/inch for the weft (horizontal yarn),
wherein the single twist yarn spun from fluorine-containing resin fiber is a yarn of at least 400 denier,
wherein the single twist yarn spun from polyester fiber has at least No. 30 cotton count,
wherein each single twist yarn has a twist count of 260 to 300 T/m,
wherein the ply yarn has a twist count of 255 to 295 T/m,
wherein the sliding contact surface-forming material is configured for use in a moist environment, and is further configured so that the fluorine-containing resin fiber and the polyester fiber are both exposed on at least one surface thereof which serves as the sliding contact surface, while keeping substantially equal areas of exposure of the fluorine-containing resin fiber and the polyester fiber on the sliding contact surface, and
wherein the sliding contact surface-forming material contains 37 to 43.5% by weight of the resol phenolic resin, 13 to 26% by weight of the polytetrafluoroethylene resin, and 37 to 43.5% by weight of the reinforcing base.

9. A sliding contact surface-forming material consisting of a reinforcing base impregnated with a resol phenolic resin having polytetrafluoroethylene resin dispersed therein, containing 37 to 43.5% by weight of the resol phenolic resin, 13 to 26% by weight of the polytetrafluoroethylene resin, and 37 to 43.5% by weight of the reinforcing base,
the reinforcing base consisting of a woven fabric formed by using a ply yarn as each of the warp and the weft, respectively, said ply yarn formed by paralleling at least two strands consisting of:

a Z-twisted single twist yarn spun from fluorine-containing resin fiber selected from the group consisting of polytetrafluoroethylene fiber, tetrafluoroethylene-perfluoroalkyl vinyl ether copolymer fiber, tetrafluoroethylene-hexafluoropropylene copolymer fiber, and ethylene-tetrafluoroethylene copolymer fiber, and a Z-twisted single twist yarn spun from polyester fiber, and by twisting them in an S-twist in a direction opposite to the direction in which the single twist yarns were spun; and wherein the reinforcing base is a flat-woven fabric having a density of 36 to 44 ends/inch for the warp (vertical yarn), and 36 to 44 picks/inch for the weft (horizontal yarn), wherein the single twist yarn spun from fluorine-containing resin fiber is a yarn of at least 400 denier, wherein the Z-twisted single twist yarn spun from polyester fiber has at least No. 30 cotton count, wherein each single twist yarn has a twist count of 260 to 300 T/m, wherein the sliding contact surface-forming material is configured for use in a moist environment, and is further configured so that the fluorine-containing resin fiber and the polyester fiber are both exposed on at least one surface thereof which serves as the sliding contact surface, while keeping substantially equal areas of exposure of the fluorine-containing resin fiber and the polyester fiber on the sliding contact surface, and wherein the ply yarn has a twist count of 255 to 295 T/m.

* * * * *